United States Patent
Shimomura et al.

(10) Patent No.: US 7,701,157 B2
(45) Date of Patent: Apr. 20, 2010

(54) MOTOR CONTROLLER AND METHOD FOR CONTROLLING MOTOR

(75) Inventors: Yasuhiro Shimomura, Aichi (JP); Hirofumi Moriya, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 49 days.

(21) Appl. No.: 11/689,781

(22) Filed: Mar. 22, 2007

(65) Prior Publication Data

US 2007/0241704 A1    Oct. 18, 2007

(30) Foreign Application Priority Data

Mar. 31, 2006   (JP) .............................. 2006-097829

(51) Int. Cl.
*H02P 7/00*   (2006.01)
(52) U.S. Cl. ....................... 318/265; 318/256; 318/266; 318/280; 318/466
(58) Field of Classification Search ................. 318/280, 318/466, 265, 266, 256, 400.38, 799, 257, 318/400.01, 400.03, 400.08, 400.09, 400.14, 318/739, 772, 798, 467, 489, 35, 66, 369, 318/626
See application file for complete search history.

(56) References Cited

U.S. PATENT DOCUMENTS

| | | | | |
|---|---|---|---|---|
| 4,852,205 A * | 8/1989 | Tanaka et al. | ............ | 15/250.17 |
| 5,341,597 A * | 8/1994 | Stoltenberg | ................. | 49/199 |
| 5,708,338 A * | 1/1998 | Cook et al. | ................. | 318/466 |
| 5,734,245 A * | 3/1998 | Terashima et al. | .......... | 318/453 |
| 5,807,209 A * | 9/1998 | Matsubara et al. | .......... | 477/176 |
| 5,831,403 A * | 11/1998 | Kanki et al. | ................. | 318/286 |
| 5,932,931 A * | 8/1999 | Tanaka et al. | .............. | 307/10.1 |
| 5,966,071 A * | 10/1999 | Tsuge et al. | ................ | 340/438 |
| 5,977,732 A * | 11/1999 | Matsumoto | ................. | 318/283 |
| 6,064,165 A * | 5/2000 | Boisvert et al. | ............ | 318/465 |
| 6,208,102 B1 * | 3/2001 | Kikuchi et al. | .............. | 318/466 |
| 6,434,885 B1 * | 8/2002 | Hill | ............................ | 49/138 |
| 6,580,242 B2 * | 6/2003 | Hirose et al. | ................ | 318/445 |
| 6,594,567 B2 * | 7/2003 | Zhou et al. | .................... | 701/36 |

(Continued)

FOREIGN PATENT DOCUMENTS

GB    2380074 A1    3/2003

(Continued)

OTHER PUBLICATIONS

European Search Report, dated Jun. 6, 2007.

*Primary Examiner*—Bentsu Ro
*Assistant Examiner*—Antony M Paul
(74) *Attorney, Agent, or Firm*—Saul Ewing LLP (57) ABSTRACT

A motor controller for fully closing and opening a window glass for a vehicle door. The motor controller controls a motor that drives the window glass and includes a relay circuit connected to the motor and switching contact states in accordance with movement of the window glass. An FET is connected to the relay circuit. A sensor detects rotation speed of the motor and generates a detection signal. A CPU, which is connected to the FET and sensor, generates a duty signal having a duty ratio that is in accordance with a waveform of the detection signal generated by the sensor, provides the FET with the duty signal, and drives the motor in accordance with the waveform of the detection signal.

11 Claims, 4 Drawing Sheets

U.S. PATENT DOCUMENTS

| | | | |
|---|---|---|---|
| 6,825,623 B2 * | 11/2004 | Onozawa et al. | 318/257 |
| 6,841,955 B2 * | 1/2005 | Zhou et al. | 318/112 |
| 7,073,291 B2 * | 7/2006 | Kawanobe et al. | 49/26 |
| 7,250,736 B2 * | 7/2007 | Hirai | 318/266 |
| 7,250,737 B2 * | 7/2007 | Takahashi | 318/434 |
| 7,362,068 B2 * | 4/2008 | Yamamoto | 318/469 |
| 7,569,999 B2 * | 8/2009 | Hayashi | 318/34 |
| 2004/0070355 A1 * | 4/2004 | Ogura | 318/280 |

FOREIGN PATENT DOCUMENTS

| | | |
|---|---|---|
| JP | 2000-139095 | 5/2000 |
| JP | 2002-174076 | 6/2002 |
| JP | 2002-327574 | 11/2002 |
| JP | 2004-116184 | 4/2004 |

* cited by examiner

MOTOR CONTROLLER AND METHOD FOR CONTROLLING MOTOR

CROSS-REFERENCE TO RELATED APPLICATIONS

This application is based upon and claims the benefit of priority from prior Japanese Patent Application No. 2006-097829, filed on Mar. 31, 2006, the entire contents of which are incorporated herein by reference.

BACKGROUND OF THE INVENTION

The present invention relates to a motor controller for controlling a motor and a method for duty-controlling a motor when driving the motor, and more particularly, to control of a motor for opening and closing a door window glass of a vehicle.

A first prior art example of a power window apparatus controls the raising and lowering speed of a door window glass by controlling the duty ratio of the voltage applied to a motor for opening and closing the door window glass. The power window apparatus lowers the travel speed of the door window glass when the door window glass approaches a fully closed position or a fully open position. This reduces the noise generated when the door window glass comes in contact with the door frame.

The travel speed of the door window glass may be decreased as the door window glass approaches the fully closed position or the fully open position. In this speed decreasing control, the motor torque is reduced. As a result, the door window glass may not reach the fully closed position or the fully open position.

A second prior art example of a power window apparatus increases the duty ratio of a motor drive signal just before the door window glass reaches the fully closed position to increase the motor torque when raising the door window glass (refer to Japanese Laid-Open Patent Publication No. 2002-327574).

When the motor torque is increased just before the door window glass reaches the fully closed position, the door window glass may strike the door frame and produce a relatively large noise.

SUMMARY OF THE INVENTION

The present invention provides an apparatus and method for fully closing and fully opening an opening-and-closing member while reducing noise when fully closing and fully opening the opening-and-closing member.

One aspect of the present invention is a motor controller for controlling a motor that drives an opening-and-closing member. The motor controller includes an operation member. A relay circuit is connectable to the motor and when connected switches contact states in accordance with movement of the operation member. A switching element is connected to the relay circuit. A detection circuit detects rotation speed of the motor and generates a detection signal. A control circuit, connected to the switching element and the detection circuit, generates a duty signal having a duty ratio that is in accordance with a waveform of the detection signal generated by the detection circuit, provides the switching element with the duty signal, and controls the driving of the motor in accordance with the waveform of the detection signal.

Another aspect of the present invention is a method for controlling a motor that drives an opening-and-closing member. The motor is connected to a relay circuit that switches contact states in accordance with movement of an operation member. The relay circuit is connected to a switching element. The method includes detecting rotation speed of the motor and generating a detection signal, generating a duty signal having a duty ratio that is in accordance with a waveform of the detection signal, and providing the switching element with the duty signal to control the driving of the motor in accordance with the waveform of the detection signal.

A further aspect of the present invention is a motor controller for controlling a motor that drives an opening-and-closing member in a fully closed deceleration range, a fully open deceleration range, and a normal control range located between the fully closed deceleration range and the fully open deceleration range. The motor controller includes a relay circuit connectable to the motor. A switching element is connected to the relay circuit. A detection circuit detects rotation speed of the motor and generates a detection signal. A control circuit, connected to the switching element and the detection circuit, provides the switching element with a duty signal. The control circuit provides the switching element with the duty signal having a normal control mode duty ratio when the opening-and-closing member is in the normal control range. Further, the control circuit provides the switching element with the duty signal having a first deceleration mode duty ratio that is smaller than the normal control mode duty ratio when the opening-and-closing member moves out of the normal control range and enters the fully closed deceleration range. The control circuit also provides the switching element with the duty signal having a second deceleration mode duty ratio that is greater than the first deceleration mode duty ratio upon detection of a decrease in the rotation speed of the motor during the opening-and-closing member is in the fully closed deceleration range.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A motor controller and a method for controlling a motor according to a first embodiment of the present invention will now be described with reference to FIGS. 1 to 4.

Figure 1:
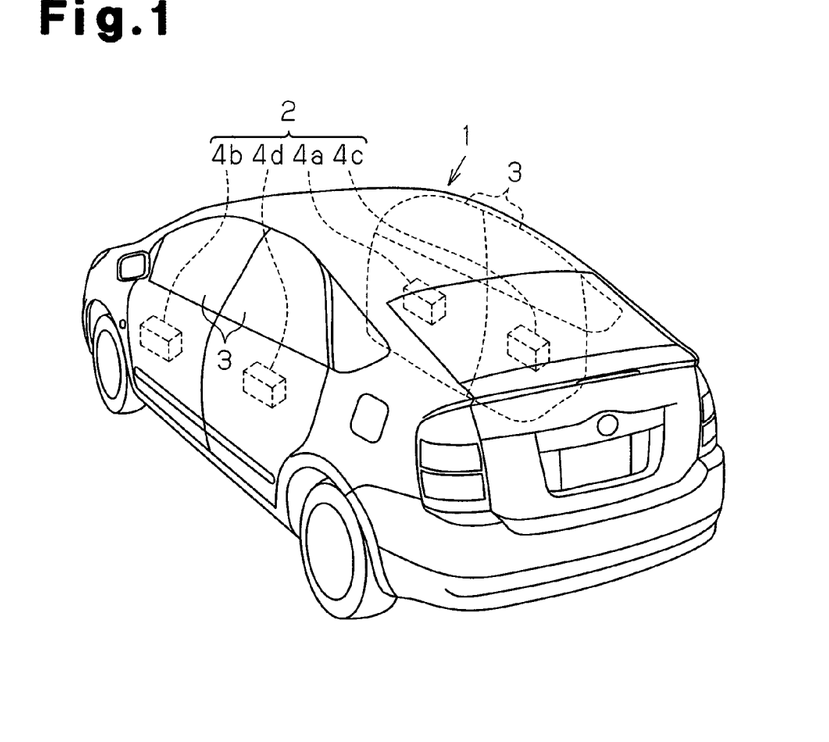
FIG. 1 is a perspective view showing a vehicle incorporating a power window apparatus according to a first embodiment of the present invention.

As shown in FIG. 1, a power window apparatus 2, which raises and lowers door window glasses 3 in response to operations of window switches 11, is installed in a vehicle 1. The power window apparatus 2 includes a plurality of power window units 4a to 4d. The power window units 4a to 4d each raise and lower the corresponding door window glass 3. The power window unit 4a for the driver seat is a master unit enabling operation of the door window glasses 3 for the front passenger seat and the rear seats. The power window units 4b to 4d for the front passenger seat and the rear seats are slave units. Each door window glass 3 functions as an opening-and-closing member. Each of the power window units 4a to 4d functions as a motor controller.

Figure 3:
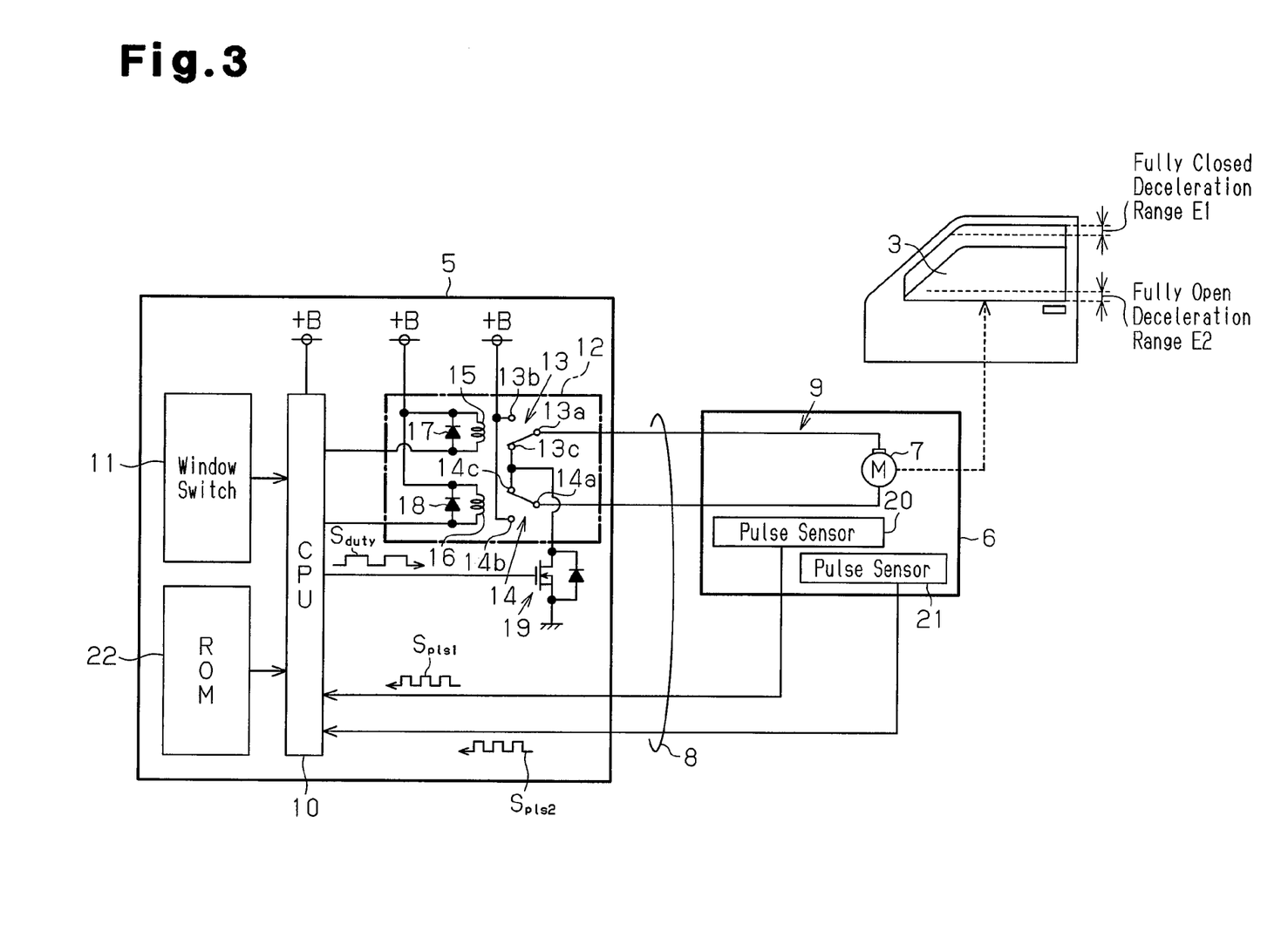
FIG. 3 is a block circuit diagram of the power window apparatus.

Referring to FIG. 3, the power window units 4a to 4d each include a switch unit 5 and a motor unit 6. The switch unit 5 includes a window switch 11, and the motor unit 6 includes a motor 7. The motor 7 is a drive source for raising and lowering the corresponding door window glass 3. The switch unit 5 is electrically connected to the motor unit 6 by wires 8. The motor unit 6 includes a motor circuit 9 connected to the motor 7. The power window units 4a to 4d each control the raising and lowering of the corresponding door window glass 3 by controlling the direction of a current flowing through the motor circuit 9 or the voltage applied to the motor 7.

The switch unit 5 includes a CPU 10 for controlling the operation of the corresponding power window unit 4a to 4d. The window switch 11 is connected to the CPU 10. The window switch 11 is switchable at a neutral position, a first closing position, a second closing position, a first opening position, and a second opening position. The window switch 11 is located at the neutral position when it is not being operated by a vehicle occupant. The door window glass 3 is raised when the window switch 11 is located at the first closing position. The door window glass 3 is lowered when the window switch 11 is located at the first opening position. When the window switch 11 is once moved to the second closing position, the door window glass 3 is automatically raised until the door window glass 3 becomes fully closed or until the window switch 11 is moved to an opening position. When the window switch 11 is once moved to the second opening position, the door window glass 3 is automatically lowered until the door window glass 3 becomes fully open or the window switch 11 is moved to a closing position. The CPU 10 functions as a control circuit. The window switch 11 functions as an operation member.

A relay circuit 12 for switching the direction of the current flowing through the motor circuit 9 is connected to the CPU 10. The relay circuit 12 includes an up-relay 13 and a down-relay 14, each of which is formed by a transfer contact (1C contact). The up-relay 13 has a movable contact 13a connected to one terminal (e.g., positive terminal) of the motor 7, a first fixed contact 13b connected to a battery, and a second fixed contact 13c connected to ground GND. The down-relay 14 includes a movable contact 14a connected to the other terminal (e.g., negative terminal) of the motor 7, a first fixed contact 14b connected to the battery, and a second fixed contact 14c connected to the ground GND.

The relay circuit 12 includes a close-side coil 15 for switching the up-relay 13 on and off. The close-side coil 15 has one terminal connected to a battery and another terminal connected to the CPU 10. When the CPU 10 energizes the close-side coil 15, the movable contact 13a and the first fixed contact 13b of the up-relay 13 are connected to each other to turn on the up-relay 13. When the CPU 10 stops energizing the close-side coil 15, the movable contact 13a and the second fixed contact 13c of the up-relay 13 are connected to each other to turn off the up-relay 13.

Further, the relay circuit 12 includes an open-side coil 16 for switching the down-relay 14 on and off. The open-side coil 16 has one terminal connected to the battery, and another terminal connected to the CPU 10. When the CPU 10 energizes the open-side coil 16, the movable contact 14a and the first fixed contact 14b of the down-relay 14 are connected to each other to turn on the down-relay 14. When the CPU 10 stops energizing the open-side coil 16, the movable contact 14a and the second fixed contact 14c of the down-relay 14 are connected to each other to turn off the down-relay 14. Circuit protection diodes 17 and 18 are connected between the two terminals of the coil 15 and the two terminals of the coil 16, respectively.

An FET 19, which may be a metal oxide semiconductor field-effect transistor (MOSFET), is arranged in a path connecting a node between the second fixed contacts 13c and 14c and the ground GND. The FET 19 has a drain terminal connected to the second fixed contacts 13c and 14c of the relays 13 and 14, a source terminal connected to the ground GND, and a gate terminal connected to the CPU 10. The CPU 10 provides a duty signal (voltage signal) to the gate terminal of the FET 19. The FET 19 is turned on and off in accordance with the level of the duty signal Sduty so that the motor circuit 9 is switched between an open circuit and a closed circuit. The FET 19 functions as a switching element.

The CPU 10 varies the duty ratio of a duty signal Sduty, which is provided to the FET 19, to control the motor 7 and adjust the raising and lowering speed of the door window glass 3. The value of the voltage applied to the motor 7 is determined in accordance with the period the FET 19 is on during a predetermined cycle. That is, the voltage applied to the motor 7 is determined in accordance with the duty ratio of the duty signal Sduty provided to the FET 19 by the CPU 10. Thus, the duty ratio of the duty signal Sduty is varied to change the value of the voltage applied to the motor 7 and alter the raising and lowering speed of the door window glass 3.

Pulse sensors 20 and 21 detect the rotation generated by the motor 7. The pulse sensors 20 and 21 provide the CPU 10 with pulse signals $S_{pls1}$ and $S_{pls2}$ having cycles corresponding to the rotation generated by the motor 7 and the speed of the rotation. The pulse sensors 20 and 21 are preferably magnetic sensors, such as a Hall element or a magnetoresistive element (MRE). However, the pulse sensors 20 and 21 do not have to magnetic sensors and may be optical sensors. The pulse sensors 20 and 21 function as detection circuits. The pulse signals $S_{pls1}$ and $S_{pls2}$ function as detection signals.

The CPU 10 receives the pulse signals $S_{pls1}$ and $S_{pls2}$ from the pulse sensors 20 and 21. The CPU 10 detects the direction of the rotation generated by the motor 7, that is, the travel direction of the door window glass 3 from the order of the edges of the pulse signals $S_{pls1}$ and $S_{pls2}$ that are provided when the motor 7 starts to generate rotation.

The CPU 10 counts the pulses of the pulse signal $S_{pls1}$ generated by the pulse sensor 20 (the same applies to the pulse sensor 21), calculates the angle and speed of the rotation generated by the motor 7 from the number of counted pulses, and calculates the travel amount of the door window glass 3. The CPU 10 determines the position of the door window glass 3 from the travel amount and travel direction of the door window glass 3.

The CPU 10 detects a change in the rotation speed of the motor 7, that is, a change in the travel speed of the door window glass 3 from a pulse length (or pulse interval) $L_{pls1}$ of the pulse signal $S_{pls1}$ generated by the pulse sensor 20 (the same applies to the pulse sensor 21).

When the door window glass 3 reaches the vicinity of a fully closed position or a fully open position (enters a fully closed deceleration range E1 or a fully open deceleration range E2 as shown in FIG. 3), the CPU 10 lowers the raising and lowering speed of the door window glass 3 by decreasing the duty ratio of the duty signal Sduty and lowering the rotation speed of the motor 7.

The switch unit 5 includes a ROM 22 storing control programs for raising and lowering the door window glass 3. The raising and lowering control programs include a fully-close/fully-open control program for fully closing and fully opening the door window glass 3 in a reliable manner. The CPU 10 executes the fully-close/fully-open control program when the door window glass 3 is in the fully closed deceleration range E1 or the fully open deceleration range E2 so that the closing or opening of the door window glass 3 does not end in an incomplete manner. The timing at which the fully-close/fully-open control starts is not limited to the timing at which the door window glass 3 reaches the fully closed deceleration range E1 or the fully open deceleration range E2. The fully-close/fully-open control may start at any timing when the door window glass 3 is within the ranges E1 and E2. The fully-close/fully-open control defines a motor control.

The CPU 10 monitors the speed of the door window glass 3 with the pulse signals $S_{pls1}$ and $S_{pls2}$. When detecting a change in the speed of the door window glass (e.g., a change in the pulse length of the pulse signal $S_{pls1}$), the CPU 10 executes entrapment prevention control on the door window glass 3. More specifically, the CPU 10 determines that a load is applied to the door window glass 3 when there is a change in the travel speed of the door window glass 3 that is calculated from the pulse signal $S_{pls1}$. The CPU 10 stops the door window glass 3 or reverses the travel direction of the door window glass 3 when an overload is applied to the door window glass 3. The entrapment prevention control is executed in ranges excluding the range in which the fully-close/fully-open control is executed.

The operation of the power window apparatus 2 will now be described.

The CPU 10 keeps the down-relay 14 off and turns on the up-relay 13 when the window switch 11 is moved to the first or second closing position. This causes the motor 7 to start generating rotation and raises the door window glass 3. When the window switch 11 is being moved to the first closing position, the motor 7 raises the door window glass 3. When the window switch 11 is moved to the second closing position, the motor 7 continues to raise the door window glass 3 even if the window switch 11 returns to the neutral position.

Figure 2:
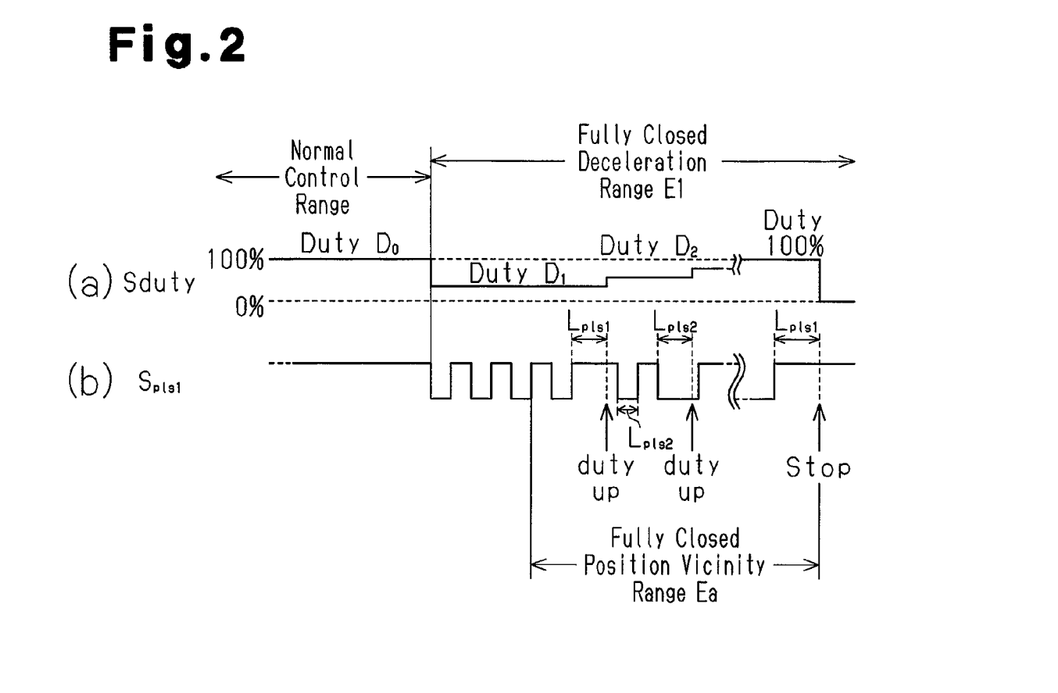
FIG. 2 is a waveform chart of a duty signal and a pulse signal.

As shown in FIG. 2(a), the CPU 10 provides the FET 19 with the duty signal Sduty having a normal control mode duty ratio D0 until the door window glass 3 that is being raised reaches the fully closed deceleration range E1. The normal control mode duty ratio D0 may be, for example, 100%. As a result, voltage that is in accordance with the duty ratio D0 is applied to the motor 7, the motor 7 generates rotation at a high rotation speed in accordance with the duty ratio D0, and the door window glass 3 is raised at a high travel speed in accordance with the duty ratio D0.

When the door window glass 3 reaches the fully closed deceleration range E1, the CPU 10 lowers the travel speed of the door window glass 3. More specifically, as shown in FIG. 2(a), the CPU 10 provides the FET 19 with the duty signal Sduty having a first deceleration mode duty ratio D1 (<D0) when the door window glass 3 reaches the fully closed deceleration range E1. As a result, a relatively low voltage, which is in accordance with the first deceleration mode duty ratio D1, is applied to the motor 7. Thus, the motor 7 generates rotation at a low rotation speed in accordance with the first deceleration mode duty ratio D1, and the door window glass 3 is raised at a low travel speed in accordance with the first deceleration mode duty ratio D1.

When the door window glass 3 is in a fully closed position vicinity range Ea that is within the fully closed deceleration range E1, the CPU 10 starts the fully-close/fully-open control and gradually raises the travel speed of the door window glass 3. More specifically, as shown in FIG. 2(b), the CPU 10 monitors the pulse length $L_{pls1}$ of the pulse signal $S_{pls1}$ received from the pulse sensor 20 (the same applies to the pulse sensor 21) and compares the pulse length $L_{pls1}$ with a first threshold Lxa. The first threshold Lxa is a threshold used in a first stage for determining whether an overload is applied to the door window glass 3 during the raising and lowering of the door window glass 3. When the pulse length $L_{pls1}$ is less than or equal to the first threshold Lxa, the CPU 10 controls the FET 19 with the duty signal Sduty having the first deceleration mode duty ratio D1.

When the pulse length $L_{pls1}$ exceeds the first threshold Lxa, the CPU 10 determines that an overload is applied to the door window glass 3 and that the drive force (torque) generated by the motor 7 in accordance with the duty signal Sduty having the first deceleration mode duty ratio D1 is insufficient for fully closing the door window glass 3. In this case, the CPU 10 switches the first deceleration mode duty ratio D1 of the duty signal Sduty to a second deceleration mode duty ratio D2 (>D1). As a result, voltage that is in accordance with the second deceleration mode duty ratio D2 is applied to the motor 7. Thus, the motor 7 raises the door window glass 3 with a drive force that is greater than the drive force generated under duty ratio D1. When the overload applied to the door window glass 3 is relatively small, the door window glass 3 is continuously raised by the torque that is in accordance with the second deceleration mode duty ratio D2.

The CPU 10 measures the pulse length $L_{pls1}$ of the pulse signal $S_{pls1}$ when the pulse signal $S_{pls1}$ has a high (H) level and the pulse length $L_{pls2}$ of the pulse signal $S_{pls1}$ when the pulse signal $S_{pls1}$ has a low (L) level. The CPU 10 then compares the pulse lengths $L_{pls1}$ and $L_{pls2}$ with the first threshold Lxa. When at least one of the pulse lengths exceeds the first threshold Lxa, the CPU 10 determines that an overload is applied to the door window glass 3.

Then, the CPU 10 compares the pulse length $L_{pls1}$ ($L_{pls2}$) of the pulse signal $S_{pls1}$ with a second threshold Lxb. The second threshold Lxb is a threshold used in a second stage for determining whether an overload is applied to the door window glass 3 during the raising and lowering of the door window glass 3. The second threshold Lxb is greater than the first threshold Lxa (Lxb>Lxa). When the pulse length $L_{pls1}$ ($L_{pls2}$) remains less than or equal to the second threshold Lxb, the CPU 10 controls the FET 19 based on the duty signal Sduty having the second deceleration mode duty ratio D2.

When the pulse length $L_{pls1}$ ($L_{pls2}$) exceeds the second threshold Lxa, the CPU 10 determines that an overload greater than expected is applied to the door window glass 3 and determines that the drive force (torque) produced by the motor 7 in accordance with the duty signal Sduty having the second deceleration mode duty ratio D2 is insufficient for fully closing the door window glass 3. In this case, the CPU 10 switches the second deceleration mode duty ratio D2 of the duty signal Sduty to a third deceleration mode duty ratio D3 (>D2). As a result, voltage that is in accordance with the third deceleration mode duty ratio D3 is applied to the motor 7, and the motor 7 raises the door window glass 3 with a drive force greater than the drive force generated under the duty ratio D2. If the drive force generated under the third deceleration mode duty ratio D3 is determined as being sufficient, the raising of the door window glass 3 continues with the drive force generated under the third deceleration mode duty ratio D3.

Afterwards, the CPU 10 monitors the pulse length $L_{pls1}$ ($L_{pls2}$) of the pulse signal $S_{pls1}$ and increases the duty ratio of the duty signal Sduty in the same manner whenever the pulse length $L_{pls1}$ ($L_{pls2}$) exceeds a threshold. When the pulse length $L_{pls1}$ ($L_{pls2}$) exceeds a maximum threshold Lx100 after the duty ratio reaches 100%, the CPU 10 determines that an abnormally high overload is applied to the door window glass 3. The maximum threshold Lx100 is a value for determining that the door window glass 3 must be forcibly stopped. When the pulse length $L_{pls1}$ ($L_{pls2}$) exceeds the maximum threshold Lx100, the CPU 10 turns off both the up-relay 13 and the down-relay 14 to terminate the fully-close/fully-open control and stop the raising of the door window glass. 3

When detecting that the door window glass 3 has reached the fully closed position before the duty ratio of the pulse signal $S_{pls1}$ reaches 100%, the CPU 10 terminates the fully-close/fully-open control. The fully-open control of the door window glass 3 described above is similar to the fully-close control and therefore will not be described in detail.

Figure 4:
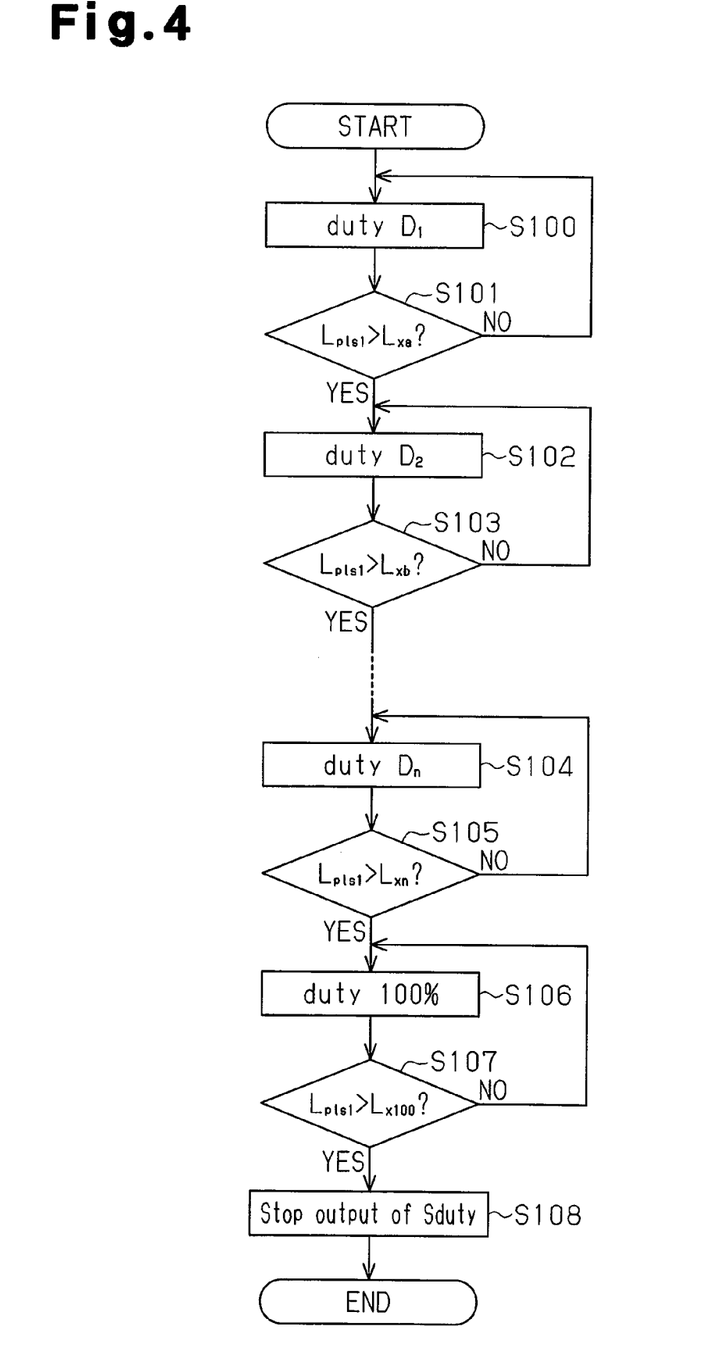
FIG. 4 is a flowchart showing the procedures for executing fully-close/fully-open control.

The fully-close/fully-open control executed by the CPU 10 will now be described with reference to a flowchart shown in FIG. 4.

In step S100, the CPU 10 provides the FET 19 with the duty signal Sduty having the duty ratio D1.

In step S101, the CPU 10 determines whether the pulse length $L_{pls1}$ ($L_{pls2}$) of the pulse signal $S_{pls1}$ received from the pulse sensor 20 exceeds the first threshold Lxa. When the pulse length $L_{pls1}$ ($L_{pls2}$) does not exceed the first threshold Lxa, the CPU 10 returns to step S100. When the pulse length $L_{pls1}$ ($L_{pls2}$) exceeds the first threshold Lxa, the CPU 10 proceeds to step S102.

In step S102, the CPU 10 provides the FET 19 with the duty signal Sduty having the duty ratio D2.

In step S103, the CPU 10 determines whether the pulse length $L_{pls1}$ ($L_{pls2}$) of the pulse signal $S_{pls1}$ exceeds the second threshold Lxb. When the pulse length $L_{pls1}$ ($L_{pls2}$) does not exceed the second threshold Lxb, the CPU 10 returns to step S102. When the pulse length $L_{pls1}$ ($L_{pls2}$) exceeds the second threshold Lxb, the CPU 10 proceeds to step S104.

In step S104, the CPU 10 provides the FET 19 with the duty signal Sduty having the duty ratio Dn.

In step S105, the CPU 10 determines whether the pulse length $L_{pls1}$ ($L_{pls2}$) of the pulse signal $S_{pls1}$ exceeds the nth threshold Lxn. When the pulse length $L_{pls1}$ ($L_{pls2}$) does not exceed the nth threshold Lxn, the CPU 10 returns to step S104. When the pulse length $L_{pls1}$ ($L_{pls2}$) exceeds the nth threshold Lxn, the CPU 10 proceeds to step S106.

In step S106, the CPU 10 provides the FET 19 with the duty signal Sduty having the duty ratio of 100%.

In step S107, the CPU 10 determines whether the pulse length $L_{pls1}$ ($L_{pls2}$) of the pulse signal $S_{pls1}$ exceeds the maximum threshold Lx100. When the pulse length $L_{pls1}$ ($L_{pls2}$) does not exceed the maximum threshold Lx100, the CPU 10 returns to step S106. When the pulse length L $L_{pls1}$ ($L_{pls2}$) exceeds the maximum threshold Lx100, the CPU 10 proceeds to step S108.

In step S108, the CPU 10 turns off both the up-relay 13 and the down-relay 14 and stops the motor 7.

As described above, the CPU 10 gradually increases the duty ratio of the duty signal Sduty every time the pulse length $L_{pls1}$ of the pulse signal $S_{pls1}$ exceeds a threshold (first threshold Lxa, second threshold Lxb, etc.) during the door window glass 3 is in the fully closed position vicinity range Ea. The fully-close/fully-open process of the motor 7 produces sufficient torque with the motor 7 to raise or lower the door window glass 3 that has been decelerated. This prevents the door window glass 3 from failing to reach the fully closed position or fully open position. Further, the deceleration control of the motor 7 reduces noise from the door window glass 3 when the door window glass 3 becomes fully closed or open.

To compensate for the insufficiency of the torque produced by the motor 7, the CPU 10 increases the output torque of the motor 7 by increasing the duty ratio to be higher than normal. This increases the voltage applied to the motor 7. The increased amount of the duty ratio is determined in accordance with the pulse length $L_{pls1}$, that is, in accordance with the present rotation speed of the motor 7. Accordingly, the duty ratio generated by the motor 7 with the increased duty ratio is the minimum torque required to compensate for the insufficient torque. This minimizes the noise of the door window glass 3 that is generated when the door window glass 3 hits the door frame.

The FET 19 is turned on and off based on the duty signal Sduty having the duty ratio determined in accordance with the present pulse length of the signal output by the sensors 20 and 21. Thus, the motor 7 generates torque in accordance with the present pulse length. As a result, the motor control of the first embodiment enables the motor 7 to generate the optimal torque under the present circumstances.

The first embodiment has the advantages described below.

(1) When the torque produced by the motor 7 is insufficient for fully closing or fully opening the door window glass 3, the CPU 10 gradually increases the torque while monitoring the pulse length $L_{pls1}$ of the pulse signal $S_{pls1}$. This ensures that the door window glass 3 reaches the fully closed position or fully open position, while minimizes the noise generated between the door window glass 3 and the door frame.

(2) When the fully-close/fully-open control is executed, the CPU 10 monitors the pulse length $L_{pls1}$ ($L_{pls2}$) of the pulse signal $S_{pls1}$ generated by the pulse sensor 20 and determines the rotation state of the motor 7. The pulse sensor 20 is normally used to detect the rotation speed of the motor 7. Thus, the fully-close/fully-open process of the first embodiment does not require a new sensor.

(3) The fully-close/fully-open control of the first embodiment is executed just before the door window glass 3 reaches the fully closed position or fully open position in the ranges in which the deceleration control of the door window glass 3 is executed (i.e., fully closed deceleration range E1 and fully open deceleration range E2). Thus, even when the door window glass 3 is controlled to decelerate before reaching the fully closed position or fully open position, the closing or opening of the door window glass 3 does not end in an incomplete manner (4) In the first embodiment, when the rotation speed of the motor 7 decreases and the pulse length $L_{pls1}$ ($L_{pls2}$) exceeds the threshold, the CPU 10 repeats the sequence of processes in which the duty ratio of the duty signal Sduty is increased to increase the torque, the duty ratio is maintained until the pulse length $L_{pls1}$ ($L_{pls2}$) of the pulse signal $S_{pls1}$ exceeds the next threshold, and the duty ratio is further increased when the pulse length $L_{pls1}$ ($L_{pls2}$) exceeds the next threshold. The duty ratio for controlling the motor 7 may be set in a predetermined manner in accordance with the present pulse length $L_{pls1}$ ($L_{pls2}$). However, such control would require the duty ratio to be varied whenever the pulse length $L_{pls1}$ ($L_{pls2}$) changes and is thus complicated. In contrast, the fully-close/fully-open control of the first embodiment is simple.

(5) The power window apparatus employing the fully-close/fully-open control of the first embodiment prevents the torque from becoming insufficient when the door window glass 3 is raised or lowered, while reducing noise that is generated when the door window glass 3 reaches the fully closed position or fully open position.

(6) The CPU 10 measures the pulse length $L_{pls1}$ from when the pulse signal $S_{pls1}$ rises and the pulse length $L_{pls2}$ from when the pulse signal $S_{pls1}$ falls to increase the torque when one of the pulse lengths $L_{pls1}$ and $L_{pls2}$ exceeds the threshold. Thus, as compared with when only one of the pulse lengths $L_{pls1}$ and $L_{pls2}$ is monitored, the CPU 10 determines whether the pulse length $L_{pls1}$ ($L_{pls2}$) exceeds the threshold in a more reliable manner.

Figure 5:
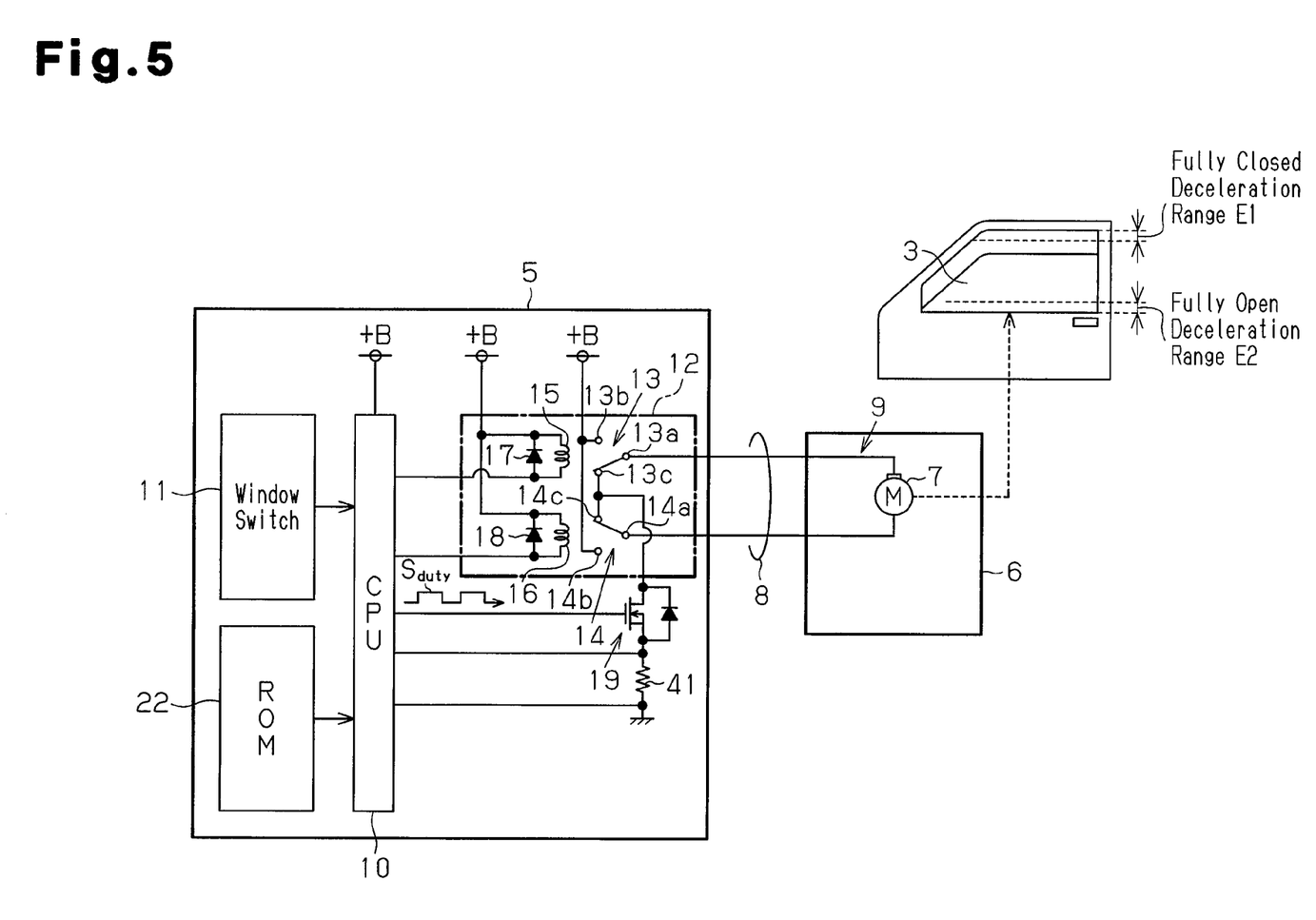
FIG. 5 is a block circuit diagram of a power window apparatus according to a second embodiment of the present invention.

A motor controller and a method for controlling a motor according to a second embodiment of the present invention will now be described focusing on differences from the first embodiment. The second embodiment employs a current detection technique to determine whether the torque is insufficient. The current detection technique eliminates the need for the pulse sensors 20 and 21 of the first embodiment.

Referring to FIG. 5, a shunt resistor 41 is connected between an FET 19 and ground GND. The shunt resistor 41 detects a change in the amount of current flowing through a motor circuit 9. The shunt resistor 41 has two terminals connected to an A/D terminal of a CPU 10. The CPU 10 detects a change amount (ΔI) of the current flowing through the motor circuit 9 via the shunt resistor 41. The CPU 10 determines whether the torque produced by the motor 7 is insufficient based on the current change amount ΔI. The shunt resistor 41 functions as a resistor element. The current change amount ΔI defines a change amount.

For example, when load is applied to the door window glass 3 such that the motor 7 becomes locked, the amount of current flowing through the motor circuit 9 increases. During deceleration control of the door window glass 3, the CPU 10 compares the calculated current change amount ΔI with a first threshold Ia. When the current change amount ΔI exceeds the first threshold Ia, the CPU 10 determines that the torque produced by the motor 7 is insufficient and thus increases the duty ratio of the motor 7 from a ratio D0 used in normal cases to a ratio D1. Then, the CPU 10 compares the current change amount ΔI with a second threshold Ib (>Ia). When the current change amount ΔI exceeds the second threshold Ib, the CPU 10 increases the duty ratio of the motor 7 from the ratio D1 to a ratio D2 (>D1) to further increase the torque of the motor 7. The CPU 10 repeats the sequence of these processes until the duty ratio reaches 100%.

The second embodiment is based on the fact that the amount of current flowing through the motor circuit 9 changes when the motor 7 becomes locked and decreases the speed of the door window glass 3 even though a constant voltage is applied to the motor 7. The CPU 10 monitors the current change amount ΔI with the shunt resistor 41, determines whether the torque of the motor 7 is insufficient, and executes the fully-close/fully-open control based on the determination result.

The second embodiment has the advantage described below in addition to advantages (3) to (5) of the first embodiment.

(7) The fully-close/fully-open control may be executed by monitoring the current change amount ΔI of the current flowing through the motor circuit 9.

It should be apparent to those skilled in the art that the present invention may be embodied in many other specific forms without departing from the spirit or scope of the invention. Particularly, it should be understood that the present invention may be embodied in the following forms.

In the first and second embodiments, the fully-close/fully-open control does not have to gradually increase the duty ratio whenever the pulse length $L_{pls1}$ ($L_{pls2}$) of the pulse signal $S_{pls1}$ exceeds the threshold. For example, the duty ratio may be may be set in a predetermined manner in accordance with the present pulse length $L_{pls1}$ ($L_{pls2}$).

The thresholds used to determine the pulse length during the fully-close/fully-open control do not necessarily have to be greater than that of the previous stage. For example, the first threshold Lxa and the second threshold Lxb may take the same values. Alternatively, the second threshold Lxb may be smaller than the first threshold Lxa (Lxb<Lxa).

In the first and second embodiments, the FET 19 functioning as a switching element is not limited to a MOSFET and may be another element such as a junction FET.

In the first and second embodiments, the ranges in which the fully-close/fully-open control is executed is not limited to the fully closed position vicinity range Ea or the fully open position vicinity range of the door window glass 3 and may be any range between the fully closed position of the door window glass 3 and the fully open position of the door window glass 3.

In the first and second embodiments, the entrapment prevention control does not have to be executed.

The deceleration control of the first and second embodiments is not limited to the control for decreasing the duty ratio in a single step when entering one of the ranges E1 and E2 and may be a control for decreasing the duty ratio in a step-by-step manner or continuously.

In the first and second embodiment, the fully-close/fully-open control is not limited to the control applied to the power window apparatus for raising and lowering the door window glasses 3. For example, the control may be applied to a sliding roof apparatus, which opens and closes a vehicle sliding roof, or a sliding door apparatus, which opens and closes a vehicle sliding door. Further, the fully-close/fully-open control of the present invention may be applied to structures other than a vehicle. For example, the fully-close/fully-open control may be applied to architectural structures, such as a window or a door of a house.

The present examples and embodiments are to be considered as illustrative and not restrictive, and the invention is not to be limited to the details given herein, but may be modified within the scope and equivalence of the appended claims.

What is claimed is:

1. A motor controller for controlling a motor that drives an opening-and-closing member, the motor controller comprising:

an operation member;

a relay circuit connectable to the motor and when connected switching contact states in accordance with movement of the operation member;

a switching element connected to the relay circuit;

a detection circuit for detecting rotation speed of the motor and generating a detection signal; and a control circuit, connected to the switching element and the detection circuit, for generating a duty signal having a duty ratio that is in accordance with a waveform of the detection signal generated by the detection circuit, providing the switching element with the duty signal, and controlling the driving of the motor in accordance with the waveform of the detection signal, wherein:

the detection circuit is a pulse sensor and the detection signal is a pulse signal having a pulse length that is in accordance with the rotation speed of the motor; and when the opening-and-closing member is in a fully closed deceleration range or a fully open deceleration range, the control circuit monitors the pulse length of the pulse signal and gradually increases the duty ratio of the duty signal every time the pulse length of the pulse signal exceeds a threshold; and wherein the control circuit has a plurality of thresholds and sets a greater threshold as the threshold every time the pulse length of the pulse signal exceeds a previous smaller threshold.

2. The motor controller according to claim 1, wherein the control circuit:
   decreases travel speed of the opening-and-closing member when the opening-and-closing member is in either one of a fully closed deceleration range located near a position at which the opening-and-closing member is fully closed and a fully open deceleration range located near a position at which the opening-and-closing member is fully open; and
   controls the drive of the motor after decreasing the travel speed of the opening-and-closing member in either one of the fully closed deceleration range and the fully open deceleration range.

3. The motor controller according to claim 1, wherein the control circuit:
   increases the duty ratio of the duty signal by one step when detecting a decrease in the rotation speed of the motor;
   maintains the duty ratio increased by one step until the rotation speed of the motor further decreases;
   further increases the duty ratio by one step when the rotation speed of the motor further decreases; and
   repeats the increasing of the duty ratio whenever the rotation speed of the motor decreases.

4. The motor controller according to claim 1, wherein the switching element is turned on and off in accordance with the duty signal having the duty ratio that is in accordance with the waveform of the detection signal.

5. The motor controller according to claim 1, wherein the opening-and-closing member is at least one of a vehicle window glass, a vehicle sliding roof, and a vehicle sliding door.

6. The motor controller according to claim 1, wherein the control circuit:
   generates rotation with the motor in one direction when the operation member is moved to an open position; and
   generates rotation with the motor in another direction when the operation member is moved to a closed position.

7. A method for controlling a motor that drives an opening-and-closing member, wherein the motor is connected to a relay circuit that switches contact states in accordance with movement of an operation member, and the relay circuit is connected to a switching element, the method comprising:
   detecting rotation speed of the motor and generating a detection signal wherein the detection signal is a pulse signal having a pulse length that is in accordance with the rotation speed of the motor;
   generating a duty signal having a duty ratio that is in accordance with a waveform of the detection signal;
   providing the switching element with the duty signal to control the driving of the motor in accordance with the waveform of the detection signal; and
   when the opening-and-closing member is in a fully closed deceleration range or a fully open deceleration range, monitoring the pulse length of the pulse signal and gradually increases the duty ratio of the duty signal every time the pulse length of the pulse signal exceeds a threshold;
   and further comprising:
   setting a greater threshold as the threshold every time the pulse length of the pulse signal exceeds a previous smaller threshold.

8. A motor controller for controlling a motor that drives an opening-and-closing member in a fully closed deceleration range, a fully open deceleration range, and a normal control range located between the fully closed deceleration range and the fully open deceleration range, the motor controller comprising:
   a relay circuit connectable to the motor;
   a switching element connected to the relay circuit;
   a detection circuit for detecting rotation speed of the motor and generating a detection signal; and
   a control circuit, connected to the switching element and the detection circuit, for providing the switching element with a duty signal, wherein the control circuit:
      provides the switching element with the duty signal having a normal control mode duty ratio when the opening-and-closing member is in the normal control range;
      provides the switching element with the duty signal having a first deceleration mode duty ratio that is smaller than the normal control mode duty ratio when the opening-and-closing member moves out of the normal control range and enters the fully closed deceleration range; and
      provides the switching element with the duty signal having a second deceleration mode duty ratio that is greater than the first deceleration mode duty ratio upon detection of a decrease in the rotation speed of the motor during the opening-and-closing member is in the fully closed deceleration range,
   wherein:
      the detection circuit is a pulse sensor and the detection signal is a pulse signal having a pulse length that is in accordance with the rotation speed of the motor; and
      when the opening-and-closing member is in the fully closed deceleration range or the fully open deceleration range, the control circuit monitors the pulse length of the pulse signal and gradually increases the duty ratio of the duty signal every time the pulse length of the pulse signal exceeds a threshold.

9. The motor controller according to claim 8, wherein the second deceleration mode duty ratio is smaller than the normal control mode duty ratio.

10. The motor controller according to claim 8, wherein the control circuit first decreases the duty ratio when the opening-and-closing member enters the fully closed deceleration range and then gradually increases the duty ratio in a stepwise manner when the opening-and-closing member is about to reach the fully closed position.

11. The motor controller according to claim 8, wherein the control circuit has a plurality of thresholds and sets a greater threshold every time the pulse length of the pulse signal exceeds a previous smaller threshold.

* * * * *